(12) United States Patent
Chu et al.

(10) Patent No.: US 8,787,844 B2
(45) Date of Patent: Jul. 22, 2014

(54) SIGNAL TRANSCEIVING METHOD, SIGNAL TRANSCEIVER UTILIZING THE SIGNAL TRANSCEIVING METHOD, NETWORK CONNECTION METHOD AND NETWORK DEVICE UTILIZING THE NETWORK CONNECTION METHOD

(75) Inventors: Yuan-Jih Chu, Hsinchu (TW); Liang-Wei Huang, Hsinchu (TW); Ching-Yao Su, Taichung (TW); Ming-Feng Hsu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 190 days.

(21) Appl. No.: 13/609,246

(22) Filed: Sep. 10, 2012

(65) Prior Publication Data

US 2013/0072133 A1 Mar. 21, 2013

(30) Foreign Application Priority Data

Sep. 16, 2011 (CN) .......................... 2011 1 0276303

(51) Int. Cl.
*H04B 1/38* (2006.01)
*H04B 15/00* (2006.01)

(52) U.S. Cl.
CPC . *H04B 1/38* (2013.01); *H04B 15/00* (2013.01)
USPC ............ 455/73; 455/570; 455/501; 455/63.1; 379/406.01

(58) Field of Classification Search
CPC ............. H04B 15/00; H04B 1/38; H04B 3/32
USPC ............... 455/501, 63.1, 73, 570, 114.2, 296; 379/406.01
See application file for complete search history.

(56) References Cited

U.S. PATENT DOCUMENTS

| | | | |
|---|---|---|---|
| 4,970,715 A | 11/1990 | McMahan | |
| 5,822,704 A * | 10/1998 | Ishii ........................... | 455/553.1 |
| 5,950,119 A * | 9/1999 | McGeehan et al. ........... | 455/302 |
| 5,982,807 A * | 11/1999 | Snell ............................. | 375/146 |
| 6,778,594 B1 * | 8/2004 | Liu ............................... | 375/222 |
| 2003/0210740 A1 | 11/2003 | Efland | |

FOREIGN PATENT DOCUMENTS

EP         0 637 141 B1    11/2001

* cited by examiner

*Primary Examiner* — Tuan Pham
(74) *Attorney, Agent, or Firm* — Winston Hsu; Scott Margo

(57) ABSTRACT

A signal transceiving method, applied to a signal transceiver, includes: adjusting to approximate a value of a clock frequency of a signal to be transmitted from the signal transceiver to a value of a clock frequency of a received signal; performing an echo cancellation operation; computing a distance between a first certification code transmitted by the signal transceiver and a second certification code received by the signal transceiver; and stopping the echo cancellation operation when the distance is smaller than a threshold value.

16 Claims, 5 Drawing Sheets

US 8,787,844 B2

SIGNAL TRANSCEIVING METHOD, SIGNAL TRANSCEIVER UTILIZING THE SIGNAL TRANSCEIVING METHOD, NETWORK CONNECTION METHOD AND NETWORK DEVICE UTILIZING THE NETWORK CONNECTION METHOD

BACKGROUND OF THE INVENTION

1. Field of the Invention

The present invention relates to signal transceiving methods, signal transceivers, network connecting methods, and network devices, and more particularly, to signal transceiving methods, signal transceivers, network connecting methods and network devices for making a value of a clock frequency of a transmitting signal the same as that of a clock frequency of a received signal and for calculating a distance between different seeds.

2. Description of the Prior Art

In the specification of High-Definition Multimedia Interface (HDMI) 1.4, a received signal and a transmitting signal of a network device are put on the same pair of transmission lines for signal transmission. As a result, the transmitting signal may rebound to act as the echo, which further downgrades the quality of the received signal. Especially, when the network device outputs a signal which is the same as another network device, for example, both of the network devices output the same idle sequence, the echo signal resulting from the transmitting signal will be identical to the signal of another network device. At this moment, the receiving end of the network device can not differentiate whether the received signal is a signal generated from another network device or an echo signal generated due to the transmitting signal. Therefore, the connection operation of the network devices might fail when the echo signal of the transmitting signal is erroneously recognized as the signal of another network device.

To avoid this situation, an echo canceller is usually disposed in the network device to sole the aforementioned problem. However, if the echo canceller operates under different clock domains, the design of the echo canceller will be very complicated. Besides, if the echo canceller does not turn on/off at the appropriate timing, it may fail to cancel the echo signal correctly or may affect the signals to be transmitted/received, which further affects the network connection.

SUMMARY OF THE INVENTION

One of the objectives of the present invention is to provide a signal transmitting method, network connecting method and devices thereof for turning on/turning off an echo canceller at proper timing.

Another of the objectives of the present invention is to provide a signal receiving method, network connecting method and devices thereof which simplifies the design difficulty of an echo canceller.

According to one exemplary embodiment of the prevent invention, a signal transceiving method applied to a signal transceiver is disclosed. The method includes: adjusting to approximate a value of a clock frequency of a signal to be transmitted from the signal transceiver to a value of a clock frequency of a received signal; performing an echo cancellation operation; computing a distance between a first certification code transmitted by the signal transceiver and a second certification code received by the signal transceiver; and stopping the echo cancellation operation if the distance is smaller than a threshold value.

According to another exemplary embodiment of the present invention, a signal transceiver is provided. The signal transceiver includes: a transmitting frequency-tracking circuit for adjusting to approximate a value of a clock frequency of a signal to be transmitted from the signal transceiver to a value of a clock frequency of a received signal; an echo canceller for performing an echo cancellation operation; a comparator for computing a distance between a first certification code transmitted by the network device and a second certification code received by the network device; and a control unit for stopping the echo cancellation operation if the distance is smaller than a threshold value.

According to another exemplary embodiment of the present invention, a network connecting method is provided. The network connecting method includes: adjusting to approximate a value of a clock frequency of a signal to be transmitted from the network device to a value of a clock frequency of a received signal; performing an echo cancellation operation; computing a distance between a first certification code transmitted by the network device and a second certification code received by the network device; and stopping the echo cancellation operation if the distance is smaller than a threshold value.

According to yet another exemplary embodiment of the present invention, a network device is provided. The network device includes: a transmitting frequency-tracking circuit for adjusting to approximate a value of a clock frequency of a signal to be transmitted from the network device to a value of a clock frequency of a received signal; an echo canceller for performing an echo cancellation operation; a comparator for computing a distance between a first certification code transmitted by the network device and a second certification code received by the network device; and a control unit for making the echo canceller stop the echo cancellation operation if the distance is smaller than a threshold value.

By employing the aforementioned embodiment of the present invention, the connection error or the convergence failure can be avoided by using a simple circuit structure, and the design complexity of the echo canceller can be reduced by transceiving signals under the same clock domain.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
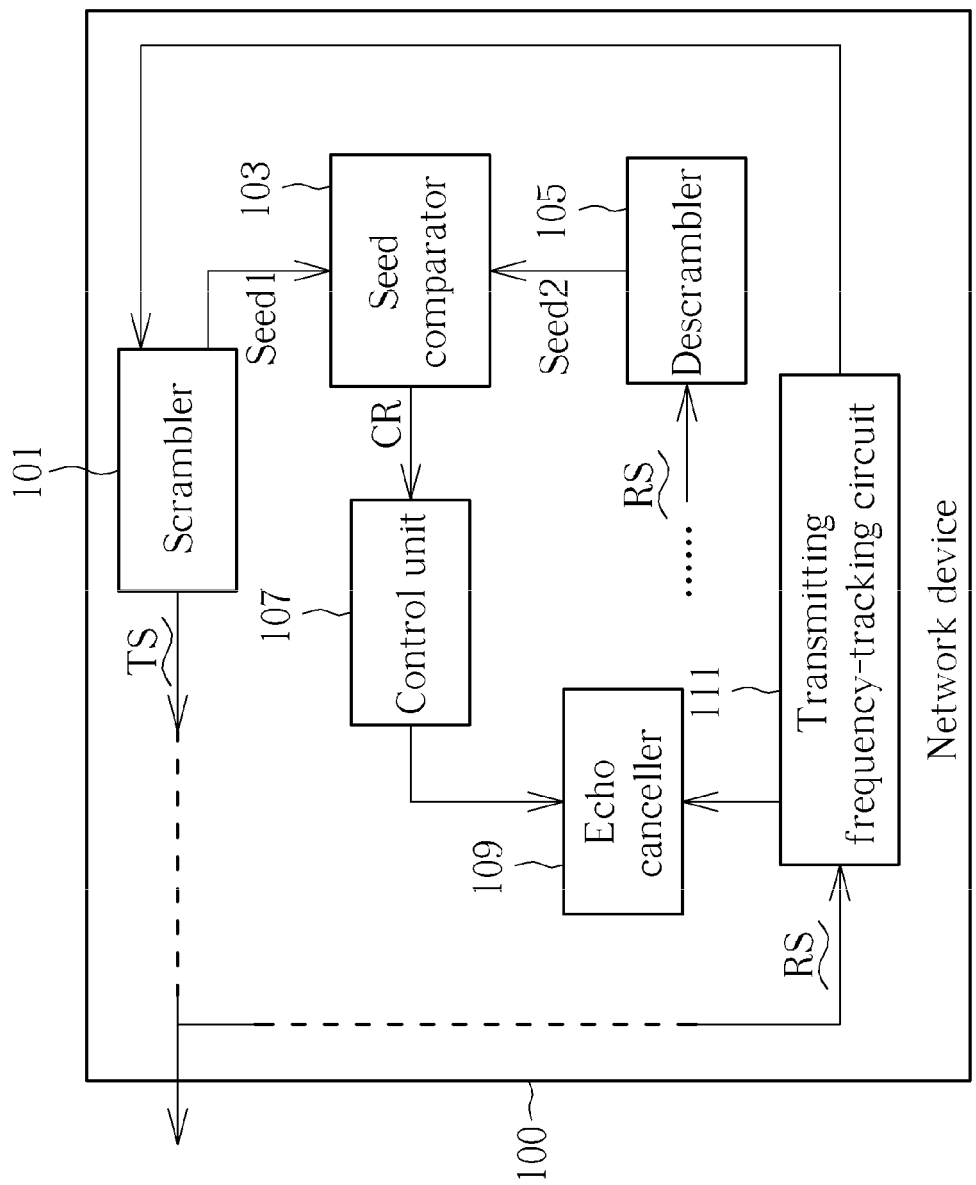
FIG. 1 illustrates a block diagram of a network device according to an exemplary embodiment of the present invention.

Please refer to FIG. 1, which illustrates a block diagram of a network device according to an exemplary embodiment of the present invention. Please notice that only the elements related to the technical features of the present invention are illustrated in the exemplary embodiment of FIG. 1, and other elements well known by people skilled in this art are omitted. In addition, people skilled in this art should readily know which elements are disposed in a network device using the same pair of transmitting lines to transmit and receiver signals, and the operation details of these elements. Moreover, the operation order of the elements mentioned in the following description is merely an exemplary embodiment, and is not meant to be a limitation of the present invention.

As shown in FIG. 1, the network device 100 includes a scrambler 101, a seed comparator 103, a descrambler 105, a control unit 107, an echo canceller 109 and a transmitting frequency-tracking circuit 111. First, the transmitting frequency-tracking circuit 111 is used for adjusting to approximate a value of a clock frequency of a signal to be transmitted from the network device to a value of a clock frequency of a received signal. In this way, the transmitting path and the receiving path of the network device 100 will be regarded as operating under the same frequency. Thus, there is no need to deal with the interferences of different clock domains, which further reduces the design complexity of the echo canceller 109. When the clock frequency of the transmitting signal is identical to the clock frequency of a signal to be received by the network device, the control unit 107 will make the echo canceller 109 turned on for performing an echo cancellation operation. The control unit 107 may be realized by hardware or firmware.

Then, the seed comparator 103 is used for comparing a first seed Seed1 and a second seed Seed2 for computing a distance between the first seed Seed1 and the second seed Seed2. The seed is a certification code. Before the data is received, it should be confirmed that which set of certification codes is to be received. After the particular set of certification codes is confirmed, the certification codes are used to process the data. In this way, a successful convergence (the connection between two networks) can be achieved. The scrambler 101 generates a transmitting signal TS according to the first seed Seed1, and the descrambler 105 is utilized for descrambling a received signal RS to generate the second seed Seed2. Please note that, before the transmitting signal TS is outputted from the network device 100, the transmitting signal TS is usually processed by other elements of the network device 100 (e.g., a digital-to-analog converter); besides, the received signal RS is also processed by other elements of the network device 100 (e.g., a programmable gain amplifier or an analog-to-digital converter). Since these operations are well known by people skilled in this art, further description is therefore omitted here for the sake of brevity. The seed comparator 103 compares the first seed Seed1 with the second seed Seed2 to generate a comparing result CR, and the control unit 107 is coupled to the seed comparator 103 for controlling the operations of the echo canceller 109 according to the comparing result CR. In an exemplary embodiment, if the comparing result CR indicates that a temporal distance between the first seed Seed1 and the second seed Seed2 is too small (for example, smaller than a threshold value), the control unit 107 would turn off the echo canceller 109 and perform the convergence operation of the network device 100 again (i.e., restart the connecting operation between the network device 100 and another target network device).

This is because if the comparing result CR indicates that a temporal distance between the first seed Seed1 and the second seed Seed2 is too smaller, it means that the first seed Seed1 transmitted by the network device 100 is too close to the received second seed Seed2; therefore the received signal RS is probably an echo signal resulting from the transmitting signal TS rather than a signal transmitted by another target network device. At this time, the control unit 107 determines that the current network connection is not surely correct, and a new convergence operation/new connecting operation is required. In another condition where the convergence operation (the connecting operation) fails, the control unit 107 also turns off the echo canceller 109 and makes the network device 100 converge (connect) again. Herein, one of the definitions of convergence operation is that, after decoding and obtaining the received signal RS, the network device 100 finds that it is not the correct second seed Seed2 to be received, meaning that the receiving operation fails, and therefore confirms the convergence failure and restart a new convergence operation.

Figure 2:
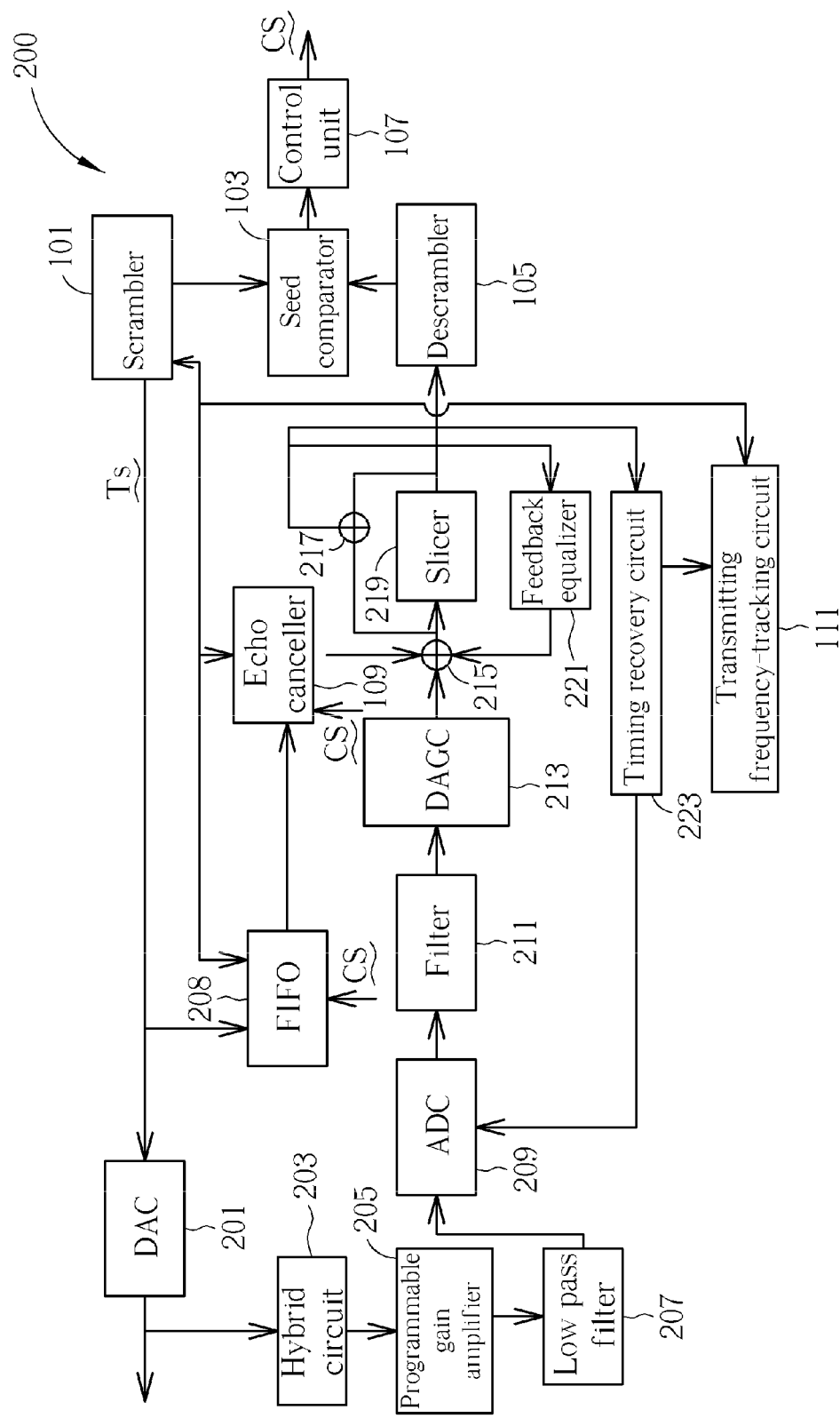
FIG. 2 is a detailed block diagram illustrating an exemplary embodiment of the network device of the present invention.

Please refer to FIG. 2, which is a detailed block diagram illustrating an exemplary embodiment of the network device of the present invention. Besides the scrambler 101, the seed comparator 103, the descrambler 105, the control unit 107, the echo canceller 109 and the transmitting frequency-tracking circuit 111, the network device 200 shown in FIG. 2 further includes a digital-to-analog converter (DAC) 201, a hybrid circuit 203, a programmable gain amplifier (PGA) 205, a low-pass filter (LPF) 207, a first in first out (FIFO) register 208, an analog-to-digital converter (ADC) 209, a filter 211, a digital automatic gain controller (DAGC) 213, two adders 215, 217, a slicer 219, a feedback equalizer 221, and a timing recovery circuit 223. Therefore, before the received signal RS is delivered to the descrambler 105, the received signal RS is processed by the hybrid circuit 203, the programmable gain amplifier 205, the low-pass filter 207, the FIFO register 208, the analog-to-digital converter 209, the filter 211, the digital automatic gain controller 213, the adders 215 and 217, the slicer 219, and the feedback equalizer 221. The transmitting signal TS is processed by the digital-to-analog converter 201 before transmitted.

Besides, in the exemplary embodiment illustrated in FIG. 2, before the transmitting frequency-tracking circuit 111 is used to make a value of a clock frequency of a transmitting signal of the network device 200 to be the same as a value of the clock frequency of a signal to be received by the network device 200, the network device 200 turns on the filter 211, the digital automatic gain controller 213, the feedback equalizer 221 and the timing recovery circuit 223, and makes the timing recovery circuit 223 lock a value of the clock frequency of a transmitting signal of a target network device. Next, the transmitting frequency-tracking circuit 111 is used to perform the aforementioned operations. In addition, after the transmitting frequency-tracking circuit 111 is enabled to perform the aforementioned operations, the control unit 107 turns on the echo canceller 109 and the FIFO register 208 to execute the echo cancellation operation, rather than merely turning on the echo canceller 109.

Since the detailed operations of other elements of the network device 200 are well known by people skilled in this art, further description is omitted here for the sake of brevity. Please note that the circuit structure of the network device 200 illustrated in FIG. 2 is for illustrating purposes only, and is not meant to be a limitation of the present invention. The disclosure of the present invention can be applied to the network devices with other circuit structures. Moreover, the disclosure of the present invention is not limited to a network device, and can be applied to any signal transceiver using only one pair of transmission lines to transmit and receive signals.

Figure 3:
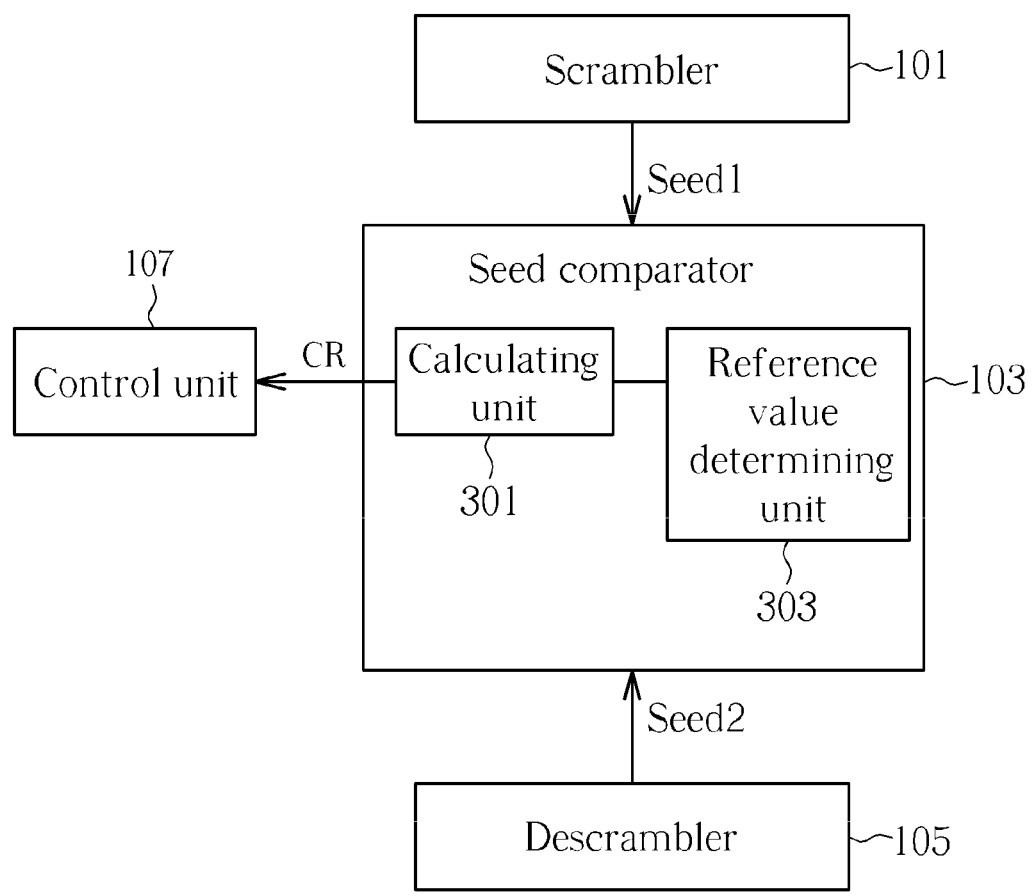
FIG. 3 is a diagram illustrating the detailed structure of the seed comparator according to an exemplary embodiment of the present invention.

Please refer to FIG. 3, which is a diagram illustrating the detailed structure of the seed comparator according to an exemplary embodiment of the present invention. As shown in FIG. 3, the seed comparator 103 includes a calculating unit 301 and a reference value determining unit 303. The reference value determining unit 303 is utilized for determining at least one seed-location reference value. The calculating unit 301 is coupled to the reference value determining unit 303, and arranged for generating the comparing result CR according to the at least one seed-location reference value, the first seed Seed1 and the second seed Seed2.

Figures 4, 5, 6:
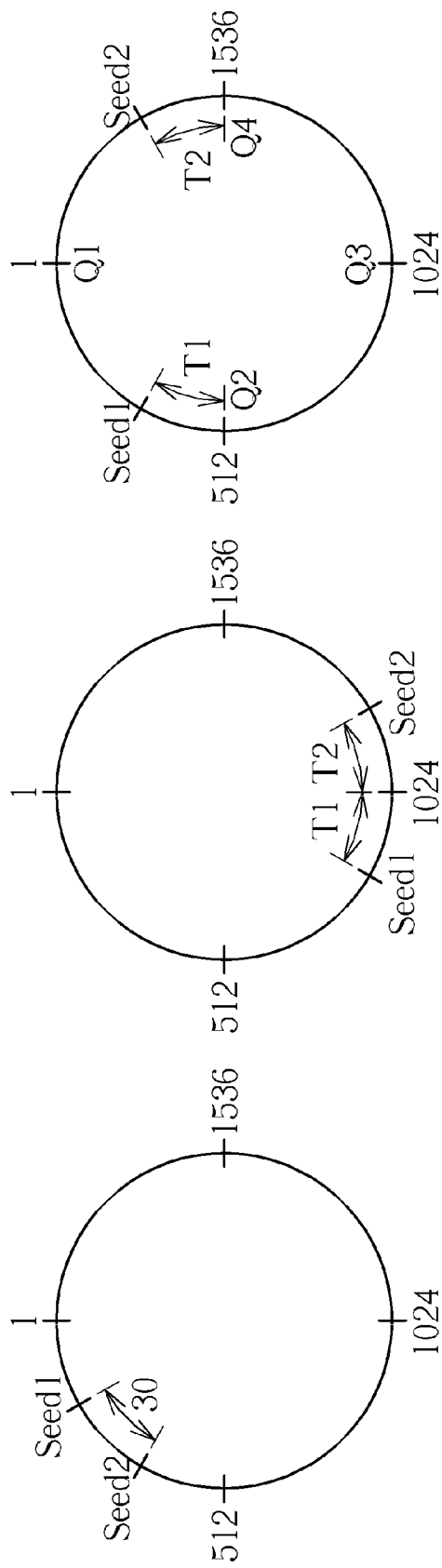
FIG. 4 is a diagram illustrating a first exemplary embodiment of the comparator that generates the comparing result.
FIG. 5 is a diagram illustrating a second exemplary embodiment of the comparator that generates the comparing result.
FIG. 6 is a diagram illustrating a third exemplary embodiment of the comparator that generates the comparing result.

Please refer to FIG. 4 to FIG. 6, FIG. 4 to FIG. 6 illustrate diagrams for exemplary embodiments of how to calculate a temporal distance between two seeds according to the network device illustrated in FIG. 3. FIG. 4 is a diagram illustrating a first exemplary embodiment of the comparator that generates the comparing result. As shown in FIG. 4, the reference value determining unit 303 uses the first seed Seed1 as the seed-location reference value. If the calculating unit 301 counts to the second seed Seed2 after 30 bit data, the comparing result CR is 30.

FIG. 5 is a diagram illustrating a second exemplary embodiment of the comparator that generates the comparing result. As shown in FIG. 5, in some exemplary embodiments of the present invention, the reference value determining unit 303 uses a middle location (e.g., 1024) of the pseudo noise sequence as the seed-location reference value. At this moment, the calculating unit 301 calculates a first temporal distance T1 between the first seed Seed1 and the middle location and a second temporal distance T2 between the second seed Seed2 and the middle location, and then uses a sum of the first temporal distance T1 and the second temporal distance T2 to determine the comparing result CR. For example, if the first temporal distance T1 between the first seed Seed1 and the middle location is 10, and the second temporal distance T2 between the second seed Seed2 and the middle location is 15, the comparing result CS is 25 (i.e., 10+15).

Please refer to FIG. 6, which is a diagram illustrating a third exemplary embodiment of the comparator that generates the comparing result. As shown in FIG. 6, the reference value determining unit 303 evenly divides the pseudo noise sequence, and uses four resultant locations (e.g., Q1, Q2, Q3, and Q4) as four seed-location reference values. If the calculating unit 301 calculates that a temporal distance between the first seed Seed1 and the seed-location reference value Q2 is 10, and a temporal distance between the second seed Seed2 and the seed-location reference value Q4 is 15, the comparing result CS will be 1049 (i.e., 10+15+1024).

As can be readily known from above description, if the number of the seed-location reference values set by the reference value determining unit 303 is larger, the speed that the calculating unit 301 calculates the temporal distance between the first seed Seed1 and the second seed Seed2 is higher, and the efficiency is better correspondingly. Please note, the number of the seed-location reference values in the above description is for illustrating purposes only, and is not meant to be a limitation of the present invention. Any means capable of calculating the temporal distance between the first seed Seed1 and the second seed Seed2 falls within the scope of the present invention. Besides, the aforementioned description not only can be applied to the seeds, but also can be applied to other kinds of certification codes.

Figure 7:
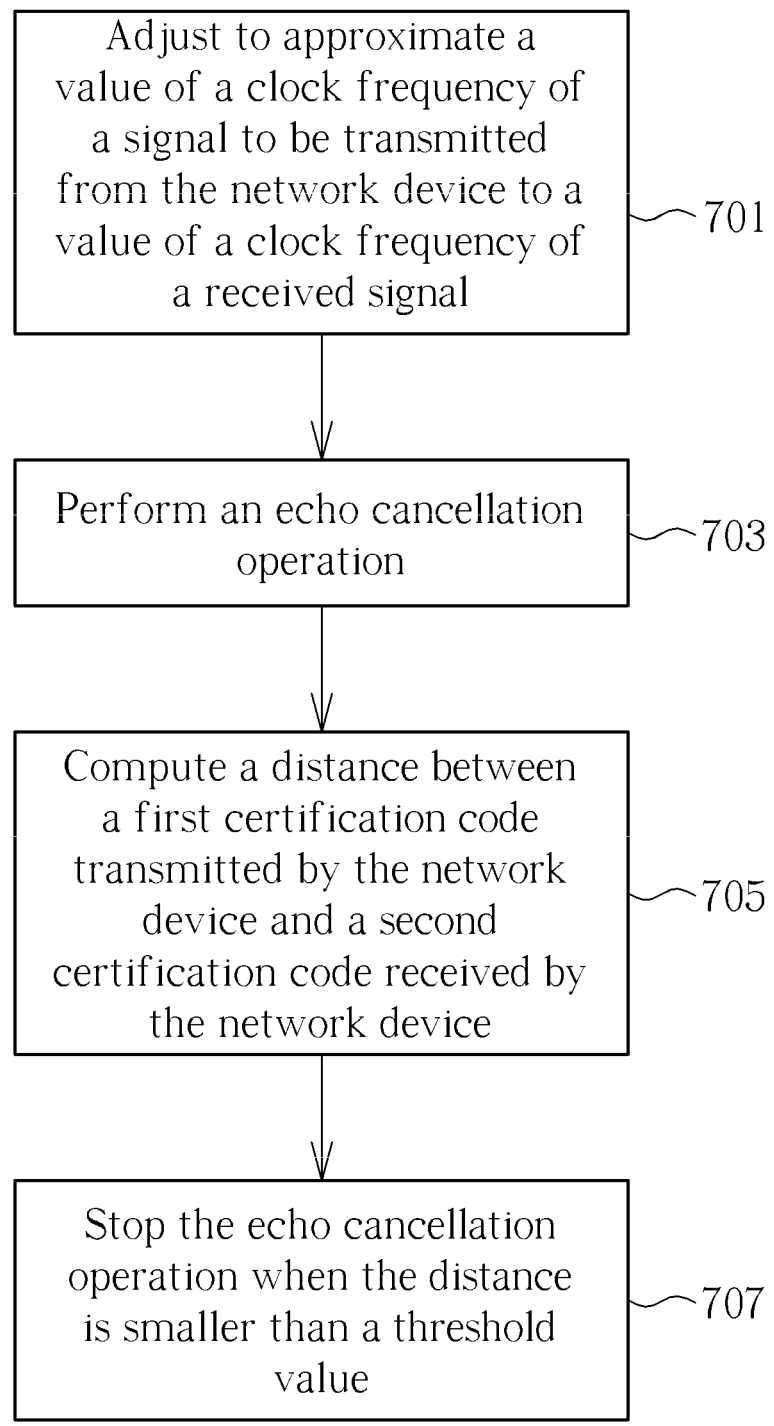
FIG. 7 is a flowchart of a network connection method according to an exemplary embodiment of the present invention.

Please refer to FIG. 7, which is a flowchart of a network connection method according to an exemplary embodiment of the present invention. Please refer to FIG. 7 in conjunction with FIG. 1 for further understanding of the present invention. FIG. 7 includes following steps:

Step 701: Adjust to approximate a value of a clock frequency of a signal to be transmitted from the network device to a value of a clock frequency of a received signal.

Step 703: Perform an echo cancellation operation.

Step 705: Compute a distance between a first certification code transmitted by the network device and a second certification code received by the network device.

Step 707: Stop the echo cancellation operation when the distance is smaller than a threshold value.

As mentioned above, the disclosure of the present invention can be applied to signal transceivers other than the network devices. That is, the flowchart of FIG. 7 can be regarded as a flowchart of the signal transceiving method of the present invention. Therefore, the network device in steps 701 and 705 may be changed to the signal transceiver. Since a person skilled in the art can readily understand details of other steps of the signal transceiving method after reading the aforementioned exemplary embodiments, further description is omitted here for the sake of brevity.

By employing the aforementioned embodiment of the present invention, the connection error or the convergence failure can be avoided by using a simple circuit structure, and the design complexity of the echo canceller can be reduced by transceiving signals under the same clock domain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transceiving method applied to a signal transceiver, comprising:
    adjusting to approximate a value of a clock frequency of a signal to be transmitted from the signal transceiver to a value of a clock frequency of a received signal;
    performing an echo cancellation operation;
    computing a distance between a first certification code transmitted by the signal transceiver and a second certification code received by the signal transceiver; and
    stopping the echo cancellation operation when the distance is smaller than a threshold value.

2. The signal transceiving method of claim 1, further comprising:
    making the signal transceiver start a convergence operation; and
    stopping the echo cancellation operation and performing the convergence operation again when the convergence operation fails or the distance is smaller than the threshold value.

3. The signal transceiving method of claim 1, further comprising:

before the step of adjusting to approximate the value of the clock frequency of the signal to be transmitted from the signal transceiver to the value of the clock frequency of the received signal is performed, using a timing recovery circuit of the signal transceiver to lock a value of a clock frequency of a transmitting signal of a target signal transceiver.

4. The signal transceiving method of claim 1, wherein each of the first certification code and the second certification code is a seed.

5. A network connecting method applied to a network device, comprising:
adjusting to approximate a value of a clock frequency of a signal to be transmitted from the network device to a value of a clock frequency of a received signal;
performing an echo cancellation operation;
computing a distance between a first certification code transmitted by the network device and a second certification code received by the network device; and
stopping the echo cancellation operation when the distance is smaller than a threshold value.

6. The network connection method of claim 5, further comprising:
making the network device and a target network device start a connecting operation; and
stopping the echo cancellation operation and performing the connection operation again when the cancellation operation fails or the distance is smaller than the threshold value.

7. The network connection method of claim 5, further comprising:
before the step of adjusting to approximate the value of the clock frequency of the signal to be transmitted from the network device to the value of the clock frequency of the received signal is performed, using a timing recovery circuit of the network device to lock a value of a clock frequency of a transmitting signal of a target network device.

8. The network connection method of claim 5, wherein each of the first certification code and the second certification code is a seed.

9. A signal transceiver, comprising:
a transmitting frequency-tracking circuit, arranged for adjusting to approximate a value of a clock frequency of a signal to be transmitted from the signal transceiver to a value of a clock frequency of a received signal;
an echo canceller, arranged for performing an echo cancellation operation;
a comparator, arranged for computing a distance between a first certification code transmitted by the network device and a second certification code received by the network device; and
a control unit, arranged for stopping the echo cancellation operation when the distance is smaller than a threshold value.

10. The signal transceiver of claim 9, wherein a convergence operation is performed, where the echo cancellation operation is stopped and the convergence operation is performed again when the convergence operation fails or the distance is smaller than the threshold value.

11. The signal transceiver of claim 9, further comprising:
a timing recovery circuit, arranged for locking a value of a clock frequency of a transmitting signal of a target transceiver before the transmitting frequency-tracking circuit adjusts to approximate the value of the clock frequency of the signal to be transmitted from the signal transceiver to the value of the clock frequency of the received signal.

12. The signal transceiver of claim 9, wherein each of the first certification code and the second certification code is a seed.

13. A network device, comprises:
a transmitting frequency-tracking circuit, arranged for adjusting to approximate a value of a clock frequency of a signal to be transmitted from the network device to a value of a clock frequency of a received signal;
an echo canceller, arranged for performing an echo cancellation operation;
a comparator, arranged for computing a distance between a first certification code transmitted by the network device and a second certification code received by the network device; and
a control unit, arranged for making the echo canceller stop the echo cancellation operation when the distance is smaller than a threshold value.

14. The network device of claim 13, wherein a connecting operation is performed, where the control unit makes the echo canceller stop the echo cancellation operation and the network device perform the connecting operation again when the connecting operation fails or the distance is smaller than the threshold value.

15. The network device of claim 13, further comprising:
a timing recovery circuit, arranged for locking a value of a clock frequency of a transmitting signal of a target transceiver before the transmitting frequency-tracking circuit adjusts to approximate the value of the clock frequency of the signal to be transmitted from the network device to the value of the clock frequency of the received signal.

16. The network device of claim 13, wherein each of the first certification code and the second certification code is a seed.

* * * * *